United States Patent
Peng et al.

(10) Patent No.: US 12,115,749 B2
(45) Date of Patent: Oct. 15, 2024

(54) ROLLING APPARATUS

(71) Applicant: CONTEMPORARY AMPEREX TECHNOLOGY (HONG KONG) LIMITED, Hong Kong (CN)

(72) Inventors: Peng Peng, Ningde (CN); Xiaoliang Gao, Ningde (CN); Xiaokang Yan, Ningde (CN); Chaomi Zheng, Ningde (CN); Tuo Zheng, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 0 days.

(21) Appl. No.: 18/589,203

(22) Filed: Feb. 27, 2024

(65) Prior Publication Data

US 2024/0198617 A1    Jun. 20, 2024

Related U.S. Application Data

(63) Continuation of application No. PCT/CN2022/126791, filed on Oct. 21, 2022.

(30) Foreign Application Priority Data

Nov. 19, 2021   (CN) .................. 202122842232.X

(51) Int. Cl.
  *B30B 3/04*   (2006.01)
  *B30B 15/00*  (2006.01)
  *H01M 4/04*   (2006.01)

(52) U.S. Cl.
  CPC ............ *B30B 3/04* (2013.01); *B30B 15/0029* (2013.01); *H01M 4/0435* (2013.01)

(58) Field of Classification Search
  CPC ......... B30B 3/00; B30B 3/04; B30B 15/0029; H01M 4/0435
  (Continued)

(56) References Cited

U.S. PATENT DOCUMENTS 296,000 A  *  4/1884  Grimm .................. C13B 10/06
                                          100/174

FOREIGN PATENT DOCUMENTS

CN    101474633 A    7/2009
CN    110880580 A    3/2020
(Continued)

OTHER PUBLICATIONS

English translation for CN 101474633A, 4 pages (Year: 2024).*
(Continued)

*Primary Examiner* — Jimmy T Nguyen
(74) *Attorney, Agent, or Firm* — Ladas & Parry LLP

(57) ABSTRACT

A rolling apparatus includes a roller assembly and a power source. The roller assembly includes four rollers, where the four rollers (110a) are arranged side by side in pairs along a first direction and a second direction intersected with each other, and two rollers arranged side by side define a roll gap therebetween. The power source drives two rollers arranged diagonally to rotate in a same direction around their axes. Two roll gaps defined by one of the two rollers arranged diagonally and the two rollers arranged side by side therewith are used for rolling a first electrode plate twice, and two roll gaps defined by the other one of the two rollers arranged diagonally and the two rollers arranged side by side therewith are used for rolling a second electrode plate twice. In the rolling apparatus, the four rollers form strip moving routes.

8 Claims, 2 Drawing Sheets

(58) Field of Classification Search
USPC .......................................................... 100/176
See application file for complete search history.

(56) References Cited

FOREIGN PATENT DOCUMENTS

| | | |
|---|---|---|
| CN | 111716616 A | 9/2020 |
| CN | 112297489 A | 2/2021 |
| CN | 213288139 U | 5/2021 |
| CN | 216506881 U | 5/2022 |
| JP | H06285893 A | 10/1994 |
| JP | 2019107655 A | 7/2019 |

OTHER PUBLICATIONS

International Search Report dated Jan. 18, 2023 for Application No. PCT/CN2022/126791.
Written Opinion dated Jan. 18, 2023 for Application No. PCT/CN2022/126791.
Notice of Grant dated Apr. 13, 2022 for CN Application No. 202122842232.X.

* cited by examiner

ROLLING APPARATUS

CROSS-REFERENCE TO RELATED APPLICATIONS

This application is a continuation of International Application PCT/CN2022/126791 filed on Oct. 21, 2022 and claims priority to Chinese Patent Application No. 202122842232X, filed on Nov. 19, 2021. These applications are incorporated herein by reference in its entirety.

TECHNICAL FIELD

This application relates to the technical field of battery manufacturing apparatuses, and in particular, to a rolling apparatus.

BACKGROUND

A process for preparing positive and negative electrode plates of lithium batteries includes steps such as stirring, coating, rolling, slitting, and tab region formation, where the purpose of rolling is to enhance the bonding between an active substance applied on a substrate and the substrate and achieve a more uniform thickness, so as to increase compacted density of the electrode plates, thereby increasing the energy density of the battery.

In the rolling step, a two-pass rolling process may be used for rolling the electrode plates. In a currently available rolling apparatus, two pairs of paired rollers are typically used to roll one electrode plate twice in sequence, resulting in low production efficiency.

SUMMARY

In view of the foregoing problem, this application provides a rolling apparatus capable of solving the problem of low production efficiency of the currently available rolling apparatuses.

According to a first aspect, this application provides a rolling apparatus including a roller assembly and a power source. The roller assembly includes four rollers rotatable around their respective axes, where the four rollers are arranged side by side in pairs along a first direction and a second direction intersected with each other, and two rollers arranged side by side define a roll gap therebetween. The power source drives the two rollers arranged diagonally to rotate in a same direction around their axes. Two roll gaps defined by one of the two rollers arranged diagonally and two rollers arranged side by side therewith are used for rolling a first electrode plate twice, and two roll gaps defined by the other one of the two rollers arranged diagonally and the two rollers arranged side by side therewith are used for rolling a second electrode plate twice.

In technical solutions of embodiments of this application, the four rollers form strip moving routes for separately rolling the first electrode plate and the second electrode plate twice, such that each of the electrode plates can be continuously rolled twice, helping to reduce the cost of double rolling and improving the production efficiency of the rolling apparatus. In addition, the strip moving routes for the electrode plates are independent and do not interfere with each other. In a rolling process, low requirements are imposed on film width consistency and coating misalignment of the electrode plates, and breakage of one electrode plate does not affect normal rolling of another electrode plate, so a high error-tolerant rate is achieved, helping to increase the production capacity. Moreover, the rolling apparatus has a compact structure, helping to reduce a large space occupied by the rolling apparatus, thereby improving utilization of a workshop.

In some embodiments, the roll gap has an adjustable width. Thickness of a rolled electrode plate depends on the width of the roll gap. Therefore, the width of the roll gap being adjustable can adapt to manufacturing of electrode plates of different thickness specifications, allowing for higher adaptability of the rolling apparatus.

In some embodiments, one of the four rollers is rotatable around only its own axis as a reference roller, and the remaining three are all movable with respect to the reference roller. In this case, one of the four rollers is fixed and the remaining three are movable, simplifying adjustment of the roll gap.

In some embodiments, the rollers arranged by the side of the reference roller in the first direction and the second direction are respectively a first adjacent roller and a second adjacent roller; the roller arranged diagonally with the reference roller is a diagonal roller; the first adjacent roller and the second adjacent roller are respectively movable along the first direction and the second direction; and the diagonal roller is movable along the first direction and the second direction. In this case, when the width of each roll gap between the rollers is to be adjusted, linear adjustment, with a short adjustment distance, can increase the adjustment speed.

In some embodiments, the diagonal roller and the first adjacent roller move synchronously along the first direction, and the diagonal roller and the second adjacent roller move synchronously along the second direction. This not only simplifies a width adjustment process of the roll gaps but also helps to ensure width consistency of the roll gaps. Especially during cold pressing of electrode plates of a same thickness specification, the production efficiency can be significantly improved, and the flexibility, brittleness, and thickness consistency of the electrode plates are ensured.

In some embodiments, each of the rollers is rotatably mounted on a supporting part, and the movable rollers move along with their respective supporting parts. This provides convenience for a drive member to drive the movement of the roller.

In some embodiments, the rolling apparatus further includes two sets of signal transmitting members and signal receiving members matching each other. One of the signal transmitting member and the signal receiving member in a same set is disposed at the supporting part at which the diagonal roller is located, and the other one is disposed at the supporting part at which the first adjacent roller or the second adjacent roller are located; and when the signal transmitting member and the signal receiving member in a same set are disposed opposite each other, a width of the roll gap therebetween is measured. This can implement monitoring on a width adjustment process of the roll gap and allows for convenient fine adjustment for the roll gap.

In some embodiments, the rolling apparatus further includes a partition plate; the partition plate is fixedly disposed in a region defined by the four rollers together and divides the region into two strip moving regions; and the two strip moving regions are located on a same strip moving route as the two roll gaps for rolling the first electrode plate and the two roll gaps for rolling the second electrode plate, respectively. In this case, the partition plate divides the region into two strip moving regions, thereby preventing breakage of any one of the first electrode plate and the second electrode plate from interfering with strip movement of the other one.

In some embodiments, the two strip moving regions are arranged up and down; the rolling apparatus further includes a pressing plate; and the pressing plate is disposed in the upper strip moving region and defines, together with the partition plate, a strip moving gap for an electrode plate passing through the strip moving region to run through. During use of the rolling apparatus, after the electrode plate enters the upper strip moving region, the electrode plate passes through the strip moving gap formed by the pressing plate and the partition plate. When the electrode plate is broken, the broken electrode plate can be limited between the pressing plate and the partition plate without falling off under the action of its gravity while such falling affects strip movement of the electrode plate below.

In some embodiments, one of the two rollers arranged side by side is provided with a bending member, and the bending member applies a curved bending force to a rotating shaft of the roller at which the bending member is located, to make a middle portion of the roller protrude towards the other one of the two rollers arranged side by side. This helps to achieve a uniform thickness of the electrode plate.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not construed as a limitation on this application. Moreover, throughout the accompanying drawings, same parts are denoted by reference signs. In the accompanying drawings.

Figure 1:
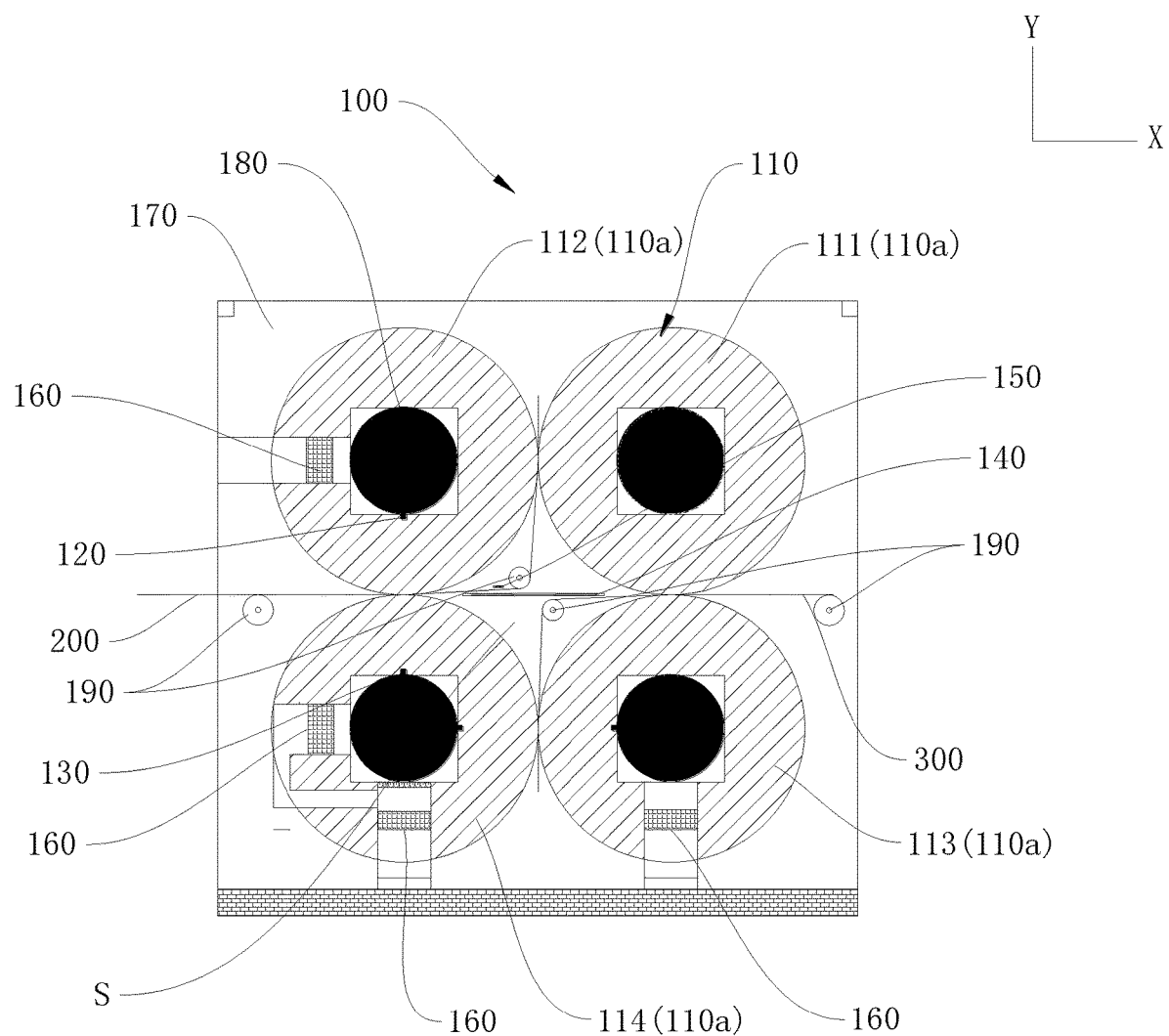
FIG. 1 is a schematic structural diagram of a rolling apparatus in use according to an embodiment of this application.

Reference signs in specific embodiments are as follows:
100. rolling apparatus; 110. roller assembly; 110*a*. roller; 111. reference roller; 112. first adjacent roller; 113. second adjacent roller; 114. diagonal roller; 120. signal transmitting member; 130. signal receiving member; 140. partition plate; 150. pressing plate; 160. drive member; 170. frame; 180. supporting part; 190. strip conveying roller; S. strip moving region; 200. first electrode plate; 300. second electrode plate; X. first direction; and Y. second direction.

DETAILED DESCRIPTION

The following describes in detail the embodiments of the technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by persons skilled in the art to which this application relates. The terms used herein are intended to merely describe the specific embodiments rather than to limit this application. The terms "include", "comprise", and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between the contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the means or components mentioned must have specific orientations or must be constructed or manipulated according to specific orientations, and therefore shall not be construed as any limitation on the embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, an internal communication between two elements, or an interaction between two elements. Persons of ordinary skill in the art can understand specific meanings of these terms in this application as appropriate to specific situations.

Production and manufacturing of lithium-ion batteries involve a plurality of steps, and each step involves knowledge and expertise that has significant influence on the final performance of the batteries. One essential step is rolling treatment for electrode plates. The main purpose of rolling is to control the electrode plates within the designed range, enhance their peel strength, and simultaneously reduce the lithium ion transport distance. For an electrode plate with significant rolling rebound (for example, a negative electrode plate), double rolling can significantly improve the performance of the electrode plate.

The inventors have noticed that the currently available rolling apparatuses typically allow for double rolling in sequence for only one electrode plate resulting in low production efficiency. To resolve this problem, in the related technology, two electrode plates overlap and are subjected to double rolling in sequence using a currently available two-pass rolling apparatus. This manner improves the production efficiency, but high requirements are imposed on film width consistency and coating misalignment of the overlapping plates, making it challenging to ensure a uniform thickness of each electrode plate after rolling. Moreover, breakage of one electrode plate affects the manufacturing of the other electrode plate.

To resolve the problem of low production efficiency of the rolling apparatus, the inventors have found through research that using the rolling apparatus to respectively and simultaneously roll two electrode plates twice can not only improve the production efficiency but also reduce the requirements on film width consistency and coating misalignment of the two electrode plates.

Based on the foregoing considerations, in order to resolve the problem of low production efficiency of the rolling apparatus, the inventors have designed a rolling apparatus through in-depth research. Four rollers form strip moving routes for separately rolling the first electrode plate and the second electrode plate twice, such that each of the electrode plates can be continuously rolled twice, helping to reduce the cost of double rolling and improving the production efficiency of the rolling apparatus. In addition, the strip moving routes for the electrode plates are independent and do not interfere with each other. In a rolling process, low requirements are imposed on film width consistency and coating misalignment of the electrode plates, and breakage of one electrode plate does not affect normal rolling of another electrode plate, so a high error-tolerant rate is achieved, helping to increase the production capacity. Moreover, the rolling apparatus has a compact structure, helping to reduce a large space occupied by the rolling apparatus, thereby improving utilization of a workshop.

According to some embodiments of this application, referring to FIG. 1, this application provides a rolling apparatus 100 including a roller assembly 110 and a power source. The roller assembly 110 includes four rollers 110a rotatable around their respective axes, where the four rollers 110a are arranged side by side in pairs along a first direction X and a second direction Y intersected with each other, and the two rollers 110a arranged side by side define a roll gap therebetween. The power source (not shown in the figure) drives the two rollers 110a arranged diagonally to rotate in a same direction around their axes. Two roll gaps defined by one of the two rollers 110a arranged diagonally and two rollers 110a arranged side by side therewith are used for rolling a first electrode plate 200 twice, and two roll gaps defined by the other one of the two rollers 110a arranged diagonally and the two rollers 110a arranged side by side therewith are used for rolling a second electrode plate 300 twice.

That "four rollers 110a are arranged side by side in pairs along a first direction X and a second direction Y intersected with each other" mean that the four rollers 110a are arranged in a 2×2 matrix, and each roller 110a is arranged side by side with other two rollers 110a in the first direction X and the second direction Y respectively. The two rollers 110a arranged side by side define the roll gap. During use of the rolling apparatus 100, an electrode plate passes through the roll gap to be rolled, and the electrode plate has a thickness greater than a width of the gap roll before passing through the roll gap. Within a reference plane constructed by the first direction X and the second direction Y, the two rollers 110a arranged side by side in the first direction X or the second direction Y mean that a center connecting line of the two rollers 110a is located in the first direction X or the second direction Y. "The two rollers 110a arranged diagonally" refer to two rollers 110a of which the center connecting line within the reference plane is not parallel to neither the first direction X nor the second direction Y.

When the rolling apparatus 100 is in use, the first direction X is a vertical direction, and the second direction Y is a horizontal direction.

One of the rollers 110a is used as a reference roller 111, the two rollers 110a arranged side by side with the reference roller 111 are respectively a first adjacent roller 112 and a second adjacent roller 113, and the roller 110a arranged diagonally with the reference roller 111 is a diagonal roller 114. That "two roll gaps defined by one of the two rollers 110a arranged diagonally and two rollers 110a arranged side by side therewith are used for rolling a first electrode plate 200 twice, and two roll gaps defined by the other one of the two rollers 110a arranged diagonally and the two rollers 110a arranged side by side therewith are used for rolling a second electrode plate 300 twice" includes that when the rolling apparatus 100 is in use, the first electrode plate 200 sequentially passes through two roll gaps defined by the reference roller 111 and the first adjacent roller 112 as well as the second adjacent roller 113 so as to be rolled twice, and the second electrode plate 300 sequentially passes through two roll gaps defined by the diagonal roller 114 and the first adjacent roller 112 as well as the second adjacent roller 113 so as to be rolled twice. In other words, the two roll gaps defined by the reference roller 111 are located in the strip moving route for the first electrode plate 200, and the two roll gaps defined by the diagonal roller 114 are located in the strip moving route for the second electrode plate 300. The roll gaps defined by the reference roller 111 are independent of the roll gaps defined by the diagonal roller 114. Therefore, the strip moving route for the first electrode plate 200 on the roller assembly 110 and the strip moving route for the second electrode plate 300 on the roller assembly 110 are independent and do not interfere with each other.

The power source drives the two rollers 110a arranged diagonally to rotate in a same direction around their respective axes, meaning that the two rollers 110a arranged diagonally convey an electrode plate into a corresponding roll gap while rotating in a same direction as drive rollers, and then under the action of the electrode plate, the adjacent rollers arranged side by side are both driven to rotate in an opposite direction. In this way, rotation of the four rollers 110a is implemented. Understandably, the first electrode plate 200 and the second electrode plate 300 flow into the roller assembly 110 in directions facing each other and flow out of the roller assembly 110 in directions facing away from each other. For example, when the first direction X is the vertical direction, and the second direction Y is the horizontal direction, the first electrode plate 200 and the second electrode plate 300 both flow into the roller assembly 110 along the horizontal direction and flow out of the roller assembly 110 along the vertical direction.

In the rolling apparatus 100, the four rollers 110a form strip moving routes for separately rolling the first electrode plate 200 and the second electrode plate 300 twice, such that each of the electrode plates can be continuously rolled twice, helping to reduce the cost of double rolling and improving the production efficiency of the rolling apparatus 100. In addition, the strip moving routes for the electrode plates are independent and do not interfere with each other. In a rolling process, low requirements are imposed on film width consistency and coating misalignment of the electrode plates, and breakage of one electrode plate does not affect normal rolling of another electrode plate, so a high error-tolerant rate is achieved, helping to increase the production capacity. Moreover, the rolling apparatus 100 has a compact structure, helping to reduce a large space occupied by the rolling apparatus 100, thereby improving utilization of a workshop.

The power source may be a commonly used component, for example, a drive apparatus such as a rotary generator or a rotary motor capable of outputting a torque. This is not described again or limited in this application.

Understandably, the rolling apparatus 100 further includes a frame 170. Each roller 110a is disposed on the frame 170 rotatably around its own axis. A specific structure of the frame 170 is not described again or limited in this application.

Preferably, the rolling apparatus 100 further includes a plurality of strip conveying rollers 190. The strip moving routes of the first electrode plate 200 and the second electrode plate 300 are each provided with the strip conveying roller 190 for conveying electrode plates.

In the embodiments, it is preferable that the four rollers 110a have an equal diameter. In this case, the rollers 110a may have the same control parameters, allowing for convenient control.

In some embodiments, the roll gap has an adjustable width.

The "width of the roll gap" refers to a distance between the two rollers 110a that define the roll gap. That the roll gap has an adjustable width indicates that the distance between the two rollers 110a that define the roll gap is adjustable. This can be implemented by moving the rollers 110a. Thickness of a rolled electrode plate depends on the width of the roll gap. Therefore, the width of the roll gap being adjustable can adapt to manufacturing of electrode plates of different thickness specifications, allowing for higher adaptability of the rolling apparatus 100.

Understandably, the two roll gaps for rolling a same electrode plate twice in sequence have different widths, and the width of the roll gap for primary rolling is greater than the width of the roll gap for secondary rolling.

In some embodiments, one of the four rollers 110a is rotatable around only its own axis as a reference roller 111, and the remaining three are all movable with respect to the reference roller 111.

During use of a rolling device, when the width of the roll gap needs to be adjusted, the reference roller 111 is used as a reference object, and the width of the roll gap is adjusted by moving the remaining three rollers 110a. In this case, one of the four rollers 110a is fixed, and the remaining three are movable, simplifying adjustment of the roll gap.

In a specific embodiment, the rollers 110a arranged side by side with the reference roller 111 in the first direction X and the second direction Y are respectively a first adjacent roller 112 and a second adjacent roller 113; the roller 110a arranged diagonally with the reference roller 111 is a diagonal roller 114; the first adjacent roller 112 and the second adjacent roller 113 are respectively movable along the first direction X and the second direction Y; and the diagonal roller 114 is movable along the first direction X and the second direction Y.

"The diagonal roller 114 is movable along the first direction X and the second direction Y" means that the diagonal roller 114 can independently move along the first direction X and the second direction Y but does not move simultaneously along both the first direction X and the second direction Y. That is, the diagonal roller 114 moves in a linear route in a moving process.

During width adjustment of the roll gaps, the width of the roll gap between the reference roller 111 and the first adjacent roller 112 is adjusted by moving the first adjacent roller 112 along the first direction X, and the width of the roll gap between the reference roller 111 and the second adjacent roller 113 by moving the second adjacent roller 113 along the second direction Y. The diagonal roller 114 moves along with the first adjacent roller 112 and the second adjacent roller 113 to ensure that the diagonal roller 114 defines roll gaps with the first adjacent roller 112 and the second adjacent roller 113. In addition, when the diagonal roller 114 moves along the first direction X or the second direction Y, the width of the roll gap between the diagonal roller 114 and the first adjacent roller 112 and the width of the roll gap between the diagonal roller 114 and the second adjacent roller 113 are respectively adjusted.

In this case, when the width of each roll gap between the rollers 110a is to be adjusted, linear adjustment, with a short adjustment distance, can increase the adjustment speed.

Certainly, in other embodiments, each of the first adjacent roller 112, the second adjacent roller 113, and the diagonal roller 114 also moves along a curve line to adjust a width of a gap between this roller and another roller 110a.

In some embodiments, the diagonal roller 114 and the first adjacent roller 112 move synchronously along the first direction X, and the diagonal roller 114 and the second adjacent roller 113 move synchronously along the second direction Y.

During width adjustment of the roll gaps, when the first adjacent roller 112 moves to adjust the width of the roll gap between the first adjacent roller 112 and the reference roller 111, the diagonal roller 114 moves synchronously along the first direction X. In this way, the width of the roll gap between the diagonal roller 114 and the first adjacent roller 112 can be synchronously adjusted; otherwise, the first adjacent roller 112 moves synchronously when the diagonal roller 114 moves along the first direction X. When the second adjacent roller 113 moves to adjust the width of the roll gap between the second adjacent roller 113 and the reference roller 111, the diagonal roller 114 moves synchronously along the second direction Y. In this way, the width of the roll gap between the diagonal roller 114 and the second adjacent roller 113 can be synchronously adjusted; otherwise, the second adjacent roller 113 moves synchronously when the diagonal roller 114 moves along the second direction Y.

This not only simplifies a width adjustment process of the roll gaps but also helps to ensure width consistency of the roll gaps. Especially during cold pressing of electrode plates of a same thickness specification, the production efficiency can be significantly improved, and the flexibility, brittleness, and thickness consistency of the electrode plates are ensured.

That "the diagonal roller 114 and the first adjacent roller 112 move synchronously along the first direction X, and the diagonal roller 114 and the second adjacent roller 113 move synchronously along the second direction Y." may be specifically implemented in various manners. For example, referring to FIG. 1, the rolling apparatus 100 includes four drive members 160. Two drive members 160 are configured to respectively drive the first adjacent roller 112 and the diagonal roller 114 to move along the first direction X, and the these two drive members 160 are driven by a same drive plate to act synchronously, such that the diagonal roller 114 and the first adjacent roller 112 move synchronously along the first direction X. The other two drive members 160 are configured to respectively drive the second adjacent roller 113 and the diagonal roller 114 to move along the second direction Y, and the these other two drive members 160 are driven by a same drive plate to act synchronously, such that the diagonal roller 114 and the second adjacent roller 113 move synchronously along the second direction Y. Certainly, in other embodiments, the diagonal roller 114 and a specific adjacent roller may alternatively be driven by a same drive member 160 to move along a specific direction through structural improvement of a transmission structure, for example, through a gear transmission structure. This is not specifically limited. The drive member 160 may be a component such as a telescopic cylinder. This is not limited herein.

In some embodiments, referring to FIG. 1, each roller 110a is rotatably mounted on a supporting part 180, and the movable rollers 110a move along with their respective supporting parts 180.

In these embodiments, in order to implement movement of each roller 110a, the roller 110a is rotatably mounted on the supporting part 180, and the supporting part 180 is movable under control. When the supporting part 180 moves, the rollers 110a move. This provides convenience for the drive member 160 to drive the movement of the rollers 110a.

The supporting part 180 may include two supporting rods. Two axial ends of each roller 110a are respectively rotatably supported on the two supporting rods. Certainly, the structure of the supporting part 180 is not limited thereto, and other structures capable of supporting the rollers 110a may also be used. During specific use, the supporting part 180 is disposed on the frame 170.

In some embodiments, referring to FIG. 1, the rolling apparatus 100 further includes two sets of signal transmitting members 120 and signal receiving members 130 matching each other. One of the signal transmitting member 120 and the signal receiving member 130 in a same set is disposed at the supporting part 180 at which the diagonal roller 114 is located, and the other one is disposed at the supporting part 180 at which the first adjacent roller 112 and the second adjacent roller 113 are located; and when the signal transmitting member 120 and the signal receiving member 130 in a same set are disposed opposite each other, the width of the roll gap therebetween is measured.

In these embodiments, since the supporting part 180 does not rotate when the rollers 110a rotate, the signal transmitting member 120 or signal receiving member 130 disposed on the supporting part 180 does not change in orientation. During movement of each supporting part 180, when the signal transmitting member 120 and the signal receiving member 130 in the same set are disposed opposite each other, it means that the signal receiving member 130 can receive a signal transmitted by the signal transmitting member 120, such that two rollers 110a on the supporting parts 180 at which the signal transmitting member 120 and the signal receiving member are located are aligned, thereby defining a roll gap. In addition, a distance between the signal receiving member 130 and the signal transmitting member 120 can be calculated based on a difference between a time at which the signal receiving member 130 receives the signal and a time at which the signal transmitting member 120 transmits the signal, thereby obtaining a width of the roll gap therebetween. After the signal receiving member 130 and the signal transmitting member 120 are disposed opposite each other, when the supporting part 180 is moved to make the signal receiving member 130 and the signal transmitting member 120 approach or leave each other, a width adjustment process of the roll gap can be monitored, allowing for convenient fine adjustment of the roll gap.

The signal transmitting member 120 and the signal receiving member 130 may be a laser transmitting member and a laser receiving member, or an infrared transmitting member or an infrared receiving member. They are not limited to any specific form.

In some embodiments, referring to FIG. 1, the rolling apparatus 100 further includes a partition plate 140; the partition plate 140 is fixedly disposed in a region defined by the four rollers 110a together and divides the region into two strip moving regions S; and the two strip moving regions S are located on a same strip moving route as the two roll gaps for rolling the first electrode plate 200 and the two roll gaps for rolling the second electrode plate 300, respectively.

The strip moving route refers to a moving route of the electrode plates. The strip moving region S being located in a specific strip moving route means that an electrode plate passes through the strip moving region S in a moving process.

During use of the rolling apparatus 100, the first electrode plate 200 and the second electrode plate 300 both enter the foregoing region via one corresponding roll gap from the periphery of the roller assembly 110 and enter another corresponding roll gap via the foregoing region. In this case, the partition plate 140 divides the region into two strip moving regions S, thereby preventing breakage of any one of the first electrode plate 200 and the second electrode plate 300 from interfering with strip movement of the other one.

In a further embodiment, referring to FIG. 1, the two strip moving regions S are arranged up and down; the rolling apparatus 100 further includes a pressing plate 150; and the pressing plate 150 is disposed in the upper strip moving region S and defines, together with the partition plate 140, a strip moving gap for an electrode plate passing through the strip moving region S to run through.

During use of the rolling apparatus 100, after the electrode plate enters the upper strip moving region S, the electrode plate passes through the strip moving gap formed by the pressing plate 150 and the partition plate 140. When the electrode plate is broken, the broken electrode plate can be limited between the pressing plate 150 and the partition plate 140 without falling off under the action of its gravity while such falling affects strip movement of the electrode plate below.

During specific use, the pressing plate 150 and the partition plate 140 are both fixed to the frame 170.

In some embodiments, one of the two rollers 110*a* arranged side by side is provided with a bending member (not shown in the figure), and the bending member applies a curved bending force to a rotating shaft of the roller 110*a* at which the bending member is located, to make a middle portion of the roller protrude towards the other one of the two rollers arranged side by side.

In these embodiments, by virtue of the bending force applied by the bending member, the roller 110*a* becomes a bent roller, with its middle portion protruding towards the other roller 110*a* by the side. In this case, the middle portion of the roller 110*a* is closer to the other roller 110*a*, and two sides of the roller 110*a* are farther away from the other roller 110*a*. During actual rolling, a coating on the middle of an electrode plate is thicker than a coating on the two sides, and the protrusion at the middle of the roller 110*a* helps to increase pressure on the middle portion of the electrode plate and reduce pressure on the two sides, thereby helping to achieve a more uniform thickness of the electrode plate.

The bending member may be a bent cylinder, and the bent cylinder is a commonly used component for forming a bent roller. This is not described herein again.

Figure 2:
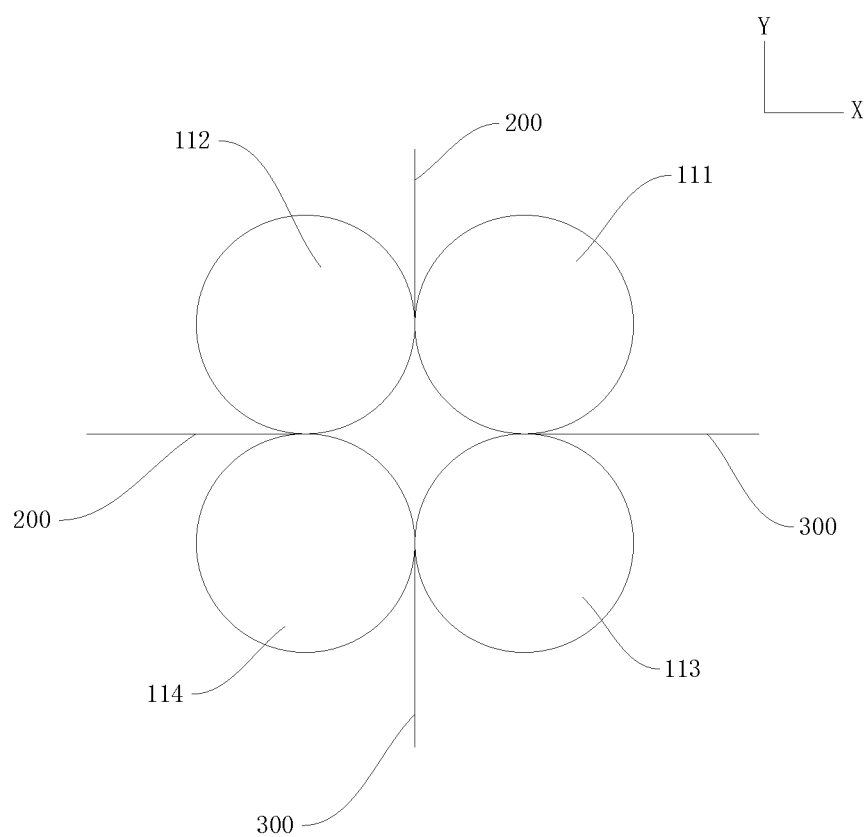
FIG. 2 is a schematic diagram of an electrode plate moving manner of a rolling apparatus according to an embodiment of this application.

In a preferred embodiment, referring to FIG. 1 and FIG. 2, four rollers 110*a* are arranged side by side in pairs along the horizontal direction and the vertical direction, and the four rollers 110*a* have an equal diameter. The top-left roller 110*a* and the bottom-right roller 110*a* rotate in a same direction under driving of the power source. The first electrode plate 200 enters from a left side of the roller assembly 110 via a roll gap defined by a pair of rollers 110*a* on the left side, and then moves out via a roll gap defined by a pair of rollers 110*a* on an upper side. The second electrode plate 300 enters from a right side of the roller assembly 110 via a roll gap defined by a pair of rollers 110*a* on the right side, and then moves out via a roll gap defined by a pair of rollers 110*a* on a lower side. The top-right roller 110*a* is fixed, and the top-left roller 110*a* is movable along the horizontal direction. The bottom-right roller 110*a* is movable along the vertical direction, and the bottom-left roller 110*a* is movable along both the horizontal direction and the vertical direction. In addition, the bottom-left roller 110*a* and the top-left roller 110*a* move synchronously, and the bottom-left roller 110*a* and the bottom-right roller 110*a* move synchronously.

Figure 3:
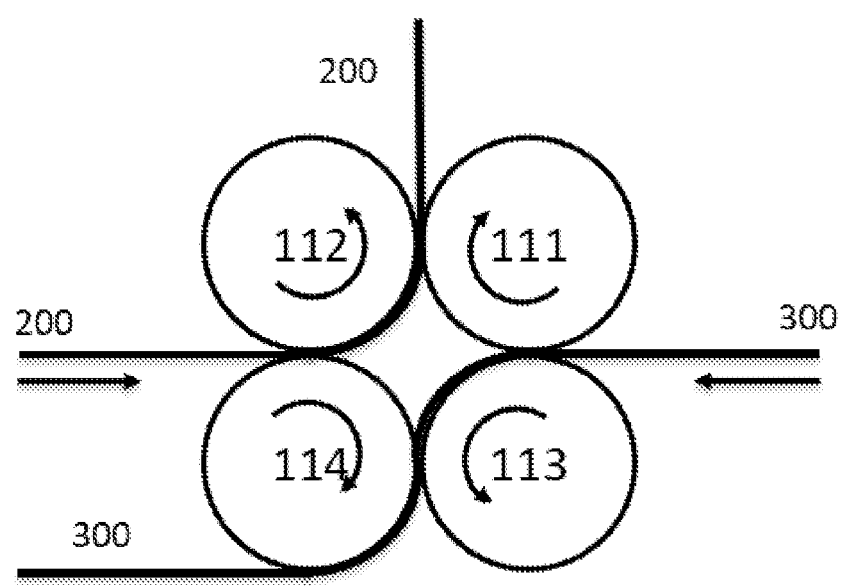
FIG. 3 is a schematic diagram of an electrode plate moving manner of a rolling apparatus according to another embodiment of this application.

It should be noted that during use of the rolling apparatus 100 in this application, there are various moving manners for the electrode plates. FIG. 2 shows one electrode plate moving manner, and FIG. 3 shows another electrode plate moving manner. Certainly, this application is not limited to the two electrode plate moving manners shown in FIG. 2 and FIG. 3.

In the rolling apparatus 100, the four rollers 110*a* form strip moving routes for separately rolling the first electrode plate 200 and the second electrode plate 300 twice, such that each of the electrode plates can be continuously rolled twice, helping to reduce the cost of double rolling and improving the production efficiency of the rolling apparatus 100. In addition, the strip moving routes for the electrode plates are independent and do not interfere with each other. In a rolling process, low requirements are imposed on film width consistency and coating misalignment of the electrode plates, and breakage of one electrode plate does not affect normal rolling of another electrode plate, so a high error-tolerant rate is achieved, helping to increase the production capacity. Moreover, the rolling apparatus 100 has a compact structure, helping to reduce a large space occupied by the rolling apparatus 100, thereby improving utilization of a workshop.

Technical features in the foregoing embodiments may be combined in any way. For brevity of description, not all possible combinations of the technical features in the foregoing embodiments are described. However, as long as there is no contradiction among combinations of these technical features, all the combinations should be considered within a range recorded in this specification.

The foregoing embodiments only represent several implementations of this application, and descriptions thereof are specific and detailed, but should not be construed as a limitation on the scope of this application patent. It should be noted that persons of ordinary skill in the art may further make several modifications and improvements without departing from the concept of this application, and all these modifications and improvements fall within the protection scope of this application. Therefore, the protection scope of the patent of this application should be subject to the appended claims.

The invention claimed is:

1. A rolling apparatus, comprising:
   a roller assembly, comprising four rollers rotatable around their respective axes; and
   a power source, for driving the four rollers to rotate around their respective axes, wherein
   the four rollers are arranged side by side in pairs along a first direction and side by side in pairs along a second direction, the first direction intersects with the second direction, and in the four rollers, any pair of two rollers arranged side by side have a roll gap therebetween; and
   in the four rollers, two rollers arranged diagonally are driven by the power source to rotate in a same direction around their axes;
   wherein
   two roll gaps defined by one of the two rollers arranged diagonally and the two rollers arranged side by side therewith are used for rolling a first electrode plate twice, and
   two roll gaps defined by the other one of the two rollers arranged diagonally and the two rollers arranged side by side therewith are used for rolling a second electrode plate twice;
   wherein the rolling apparatus further comprises a partition plate;
   the partition plate is fixedly disposed in a region defined by the four rollers together and divides the region into two strip moving regions; and
   the two strip moving regions are located on a same strip moving route as the two roll gaps for rolling the first electrode plate and the two roll gaps for rolling the second electrode plate, respectively.

2. The rolling apparatus according to claim 1, wherein the roll gap has an adjustable width.

3. The rolling apparatus according to claim 2, wherein one of the four rollers is rotatable around only its own axis as a reference roller, and the remaining three are all movable with respect to the reference roller.

4. The rolling apparatus according to claim 3, wherein
   the rollers arranged side by side with the reference roller in the first direction and the second direction are respectively a first adjacent roller and a second adjacent roller, and the roller arranged diagonally with the reference roller is a diagonal roller; and
   the first adjacent roller and the second adjacent roller are respectively movable along the first direction and the second direction; and the diagonal roller is movable along the first direction and the second direction.

5. The rolling apparatus according to claim 4, wherein the diagonal roller and the first adjacent roller move synchronously along the first direction, and the diagonal roller and the second adjacent roller move synchronously along the second direction.

6. The rolling apparatus according to claim 4, wherein each of the rollers is rotatably mounted on a supporting part, and the movable rollers move along with their respective supporting parts.

7. The rolling apparatus according to claim 6, wherein
the rolling apparatus further comprises two sets of signal transmitting members and signal receiving members matching each other;
one of the signal transmitting member and the signal receiving member in a same set is disposed at the supporting part at which the diagonal roller is located, and the other one is disposed at the supporting part at which the first adjacent roller or the second adjacent roller is located; and
when the signal transmitting member and the signal receiving member in a same set are disposed opposite each other, a width of the roll gap therebetween is measured.

8. The rolling apparatus according to claim 1, wherein
the two strip moving regions are arranged as an upper strip moving region and a down strip moving region;
the rolling apparatus further comprises a pressing plate; and
the pressing plate is disposed in the upper strip moving region and defines, together with the partition plate, a strip moving gap for an electrode plate passing through the upper strip moving region to run through.

\* \* \* \* \*